E. R. ZERKLE.
ROTARY MOTOR.
APPLICATION FILED JAN. 29, 1920.
1,372,586.
Patented Mar. 22, 1921.
3 SHEETS—SHEET 1.
Fig. 1.
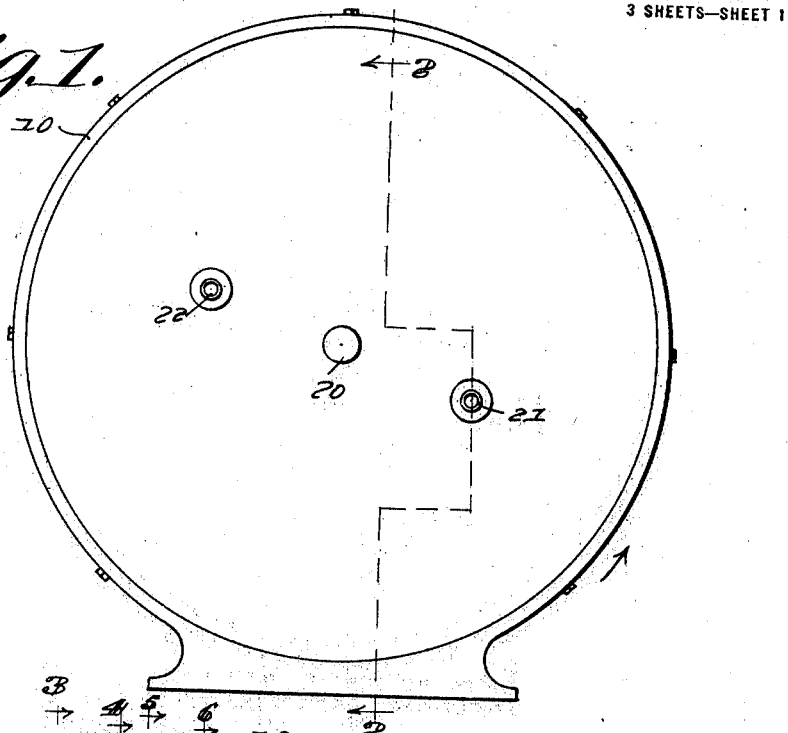
Fig. 2.
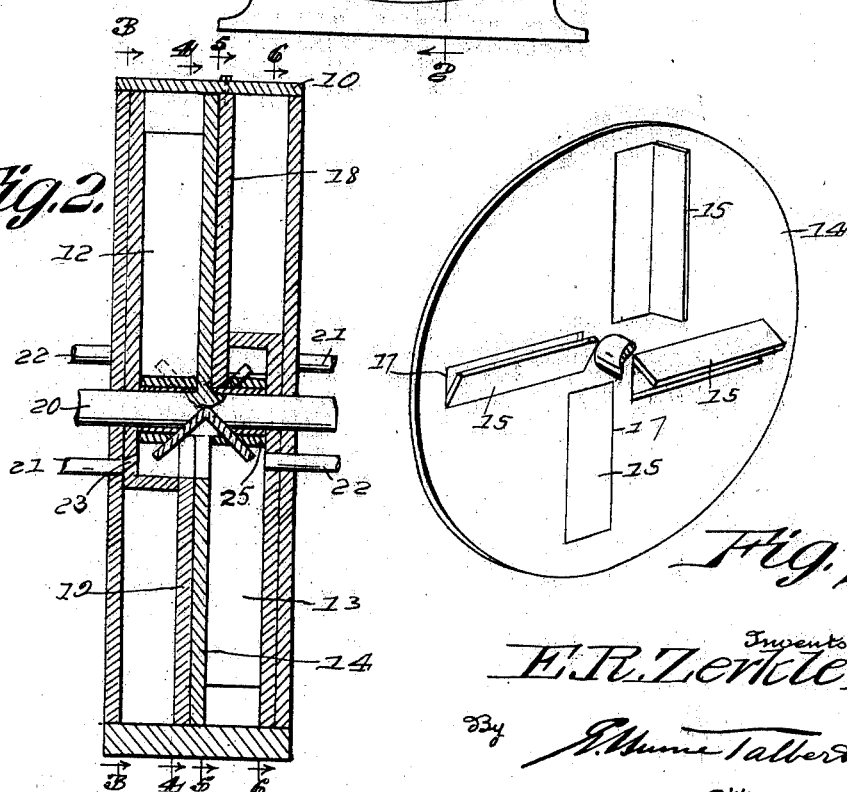
Fig. 7.
E. R. Zerkle, Inventor
By *[signature]*
Attorney E. R. ZERKLE.
ROTARY MOTOR.
APPLICATION FILED JAN. 29, 1920.
1,372,586.
Patented Mar. 22, 1921.
3 SHEETS—SHEET 2.
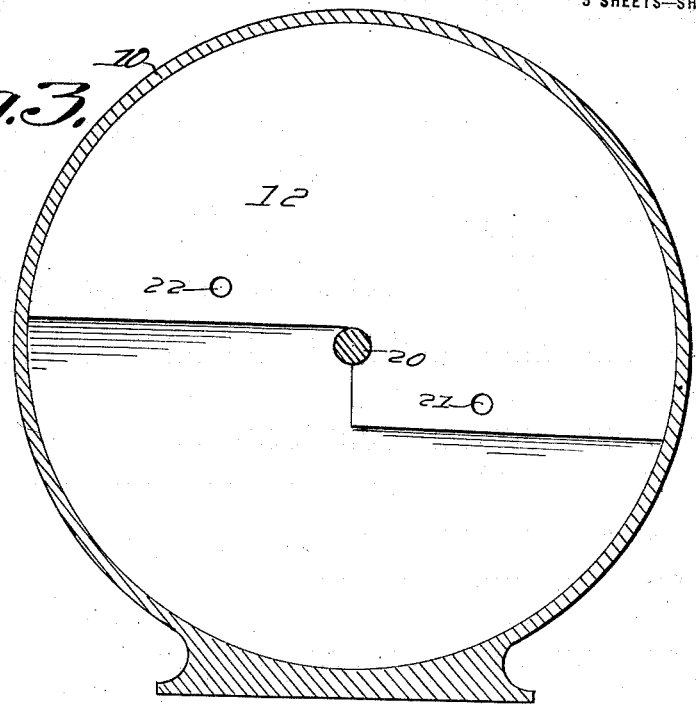
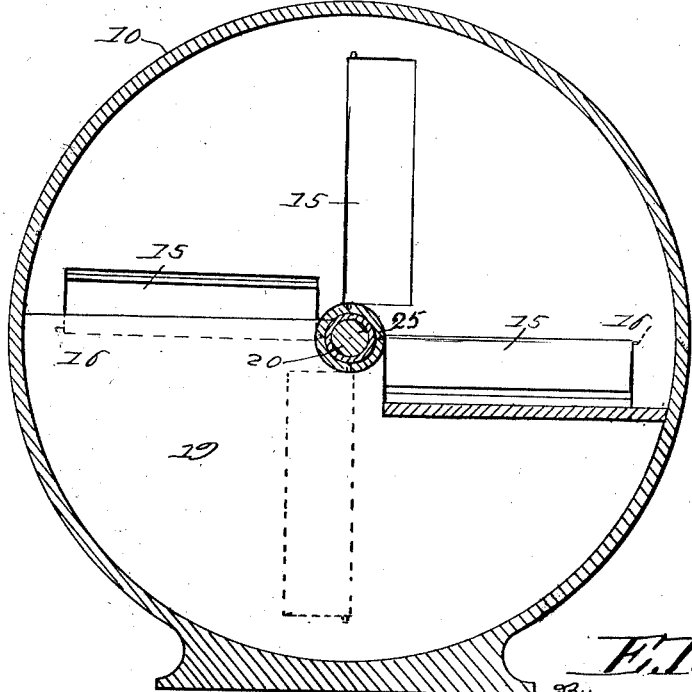
Inventor
E. R. Zerkle,
By
Attorney E. R. ZERKLE.
ROTARY MOTOR.
APPLICATION FILED JAN. 29, 1920.
1,372,586.
Patented Mar. 22, 1921.
3 SHEETS—SHEET 3.
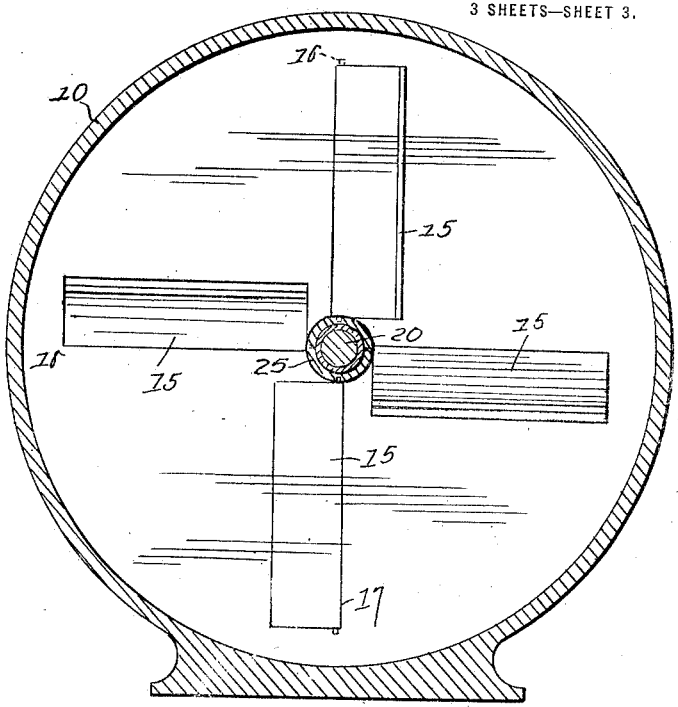
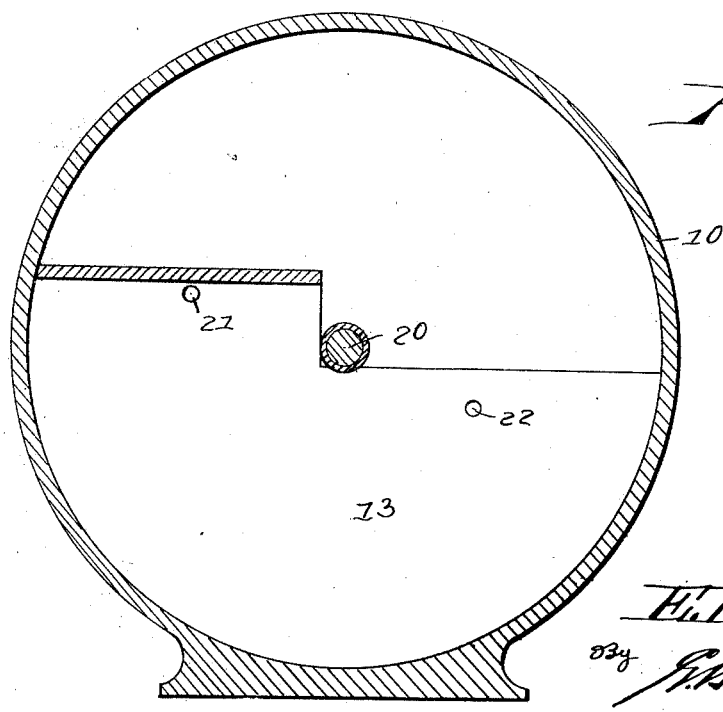

UNITED STATES PATENT OFFICE.

ELWOOD R. ZERKLE, OF XENIA, OHIO.

ROTARY MOTOR.

1,372,586.                    Specification of Letters Patent.    Patented Mar. 22, 1921.

Application filed January 29, 1920. Serial No. 354,984.

*To all whom it may concern:*

Be it known that I, ELWOOD R. ZERKLE, a citizen of the United States of America, residing at Xenia, in the county of Greene and State of Ohio, have invented new and useful Improvements in Rotary Motors, of which the following is a specification.

The object of the invention is to provide a simple and efficient construction of turbine engine adapted for utilizing both the impact and expansive force of the motive agent, such as steam or compressed air, and also adapted for use as a pump, and wherein the effect of the motive agent upon the rotor, when used as an engine, or of the rotor upon the fluid propelled thereby, when used as a pump, shall be continuous and substantially uniform, and may be accomplished with the use of a minimum number of movable parts or elements, and independently of the agency of springs or other devices subject to deterioration when subjected to high temperatures or to fluids containing acid ingredients, and with this object in view the invention consists in a construction and combination of parts of which a preferred embodiment is shown in the accompanying drawing, wherein:

Figure 1 is a side view of the apparatus.

Fig. 2 is a sectional view taken in a plane parallel with the axis of the rotor on the line 2—2 of Fig. 1.

Fig. 3 is a section at right angles to the axis of the rotor on the plane indicated by the line 3—3 of Fig. 2.

Figs. 4, 5 and 6 are similar sectional views on the planes indicated by the lines 4—4, 5—5, and 6—6 of Fig. 2.

Fig. 7 is a detail view in perspective of the rotor.

The stator of the structure is represented by a casing 10 having the diametrically oppositely disposed piston chambers 12 and 13 arranged respectively on opposite sides of the plane of an intermediate rotor 14 consisting of a disk upon which are mounted piston wings 15, each wing being composed of blades disposed at an angle of approximately ninety degrees to each other with the terminal mounting pins 16 arranged in suitable bearings in the end walls of slots 17 of the rotor disk serving as the axes of rocking movement which is disposed at the angle between or formed by said blades. The piston chamber 12 is separated from the upper portion of the casing at the opposite side of the plane of the rotor by a partition wall 18 while the piston chamber 13 is correspondingly separated from the lower portion of the casing at the opposite side of the plane of the rotor by the partition wall 19, each piston chamber in the construction illustrated being of substantially semi-circular form, with the rotor disk forming the inner wall of both piston chambers, and with the wings so mounted in the plane of the rotor disk that the respective blades thereof are adapted to alternately occupy a transverse position in spanning relation with the said piston chambers. For example, assuming that the direction of movement of the rotor is that indicated by the arrows in Figs. 1, 3, 4, 5 and 6, the piston wings above the horizontal plane of the rotor shaft 20 are adapted to be arranged with one blade in spanning relation with the piston chamber 12 and the other in the plane of the rotor disk, while below the plane of said rotor shaft the wings are extended in the opposite direction with one blade in spanning relation with the piston chamber 13 and the other in the plane of the rotor disk. The inlets for the motive agent are indicated at 21 and the outlets at 22, and said inlets as shown in Fig. 2 are preferably provided with forwardly directed nozzles 23 so as to obtain the impact effect of the steam or other motive agent upon the exposed blades of the piston wings as they are successively presented in the piston chamber. The motive agent is admitted to both of the diametrically opposed piston chambers simultaneously and continuously and it being obvious that any desired number of piston wings may be employed on the rotor, it is obvious that one or more blades will be exposed at all times to the impulse of the motive agent in both chambers. The reversal of each wing occurs at that portion of the path of each wing adjacent to the exhaust of the chamber which it has been traversing and as it approaches the inlet zone of the other piston chamber as will be seen by reference to Fig. 2 wherein the lower of the two wings illustrated represents that which is just leaving the piston chamber 13 located below the plane of the rotor shaft 20 and is opening into impact-receiving position in the piston chamber 12 which is arranged above the plane of the rotor shaft.

The inner ends of the piston wings operate in close relation to a collar 25 which embraces the rotor shaft, to eliminate leakage or waste of pressure at this point and insure an effective application of the same to the exposed blades which obviously receive not only the force of impact of the incoming motive agent but also the expansive energy thereof until the succeeding blade is brought into an extended position in the same piston chamber.

What is claimed is:

1. A rotary motor having a stator provided with diametrically opposite piston chambers, and a rotor arranged between the planes of said piston chambers and carrying piston wings each of which is composed of a pair of blades disposed at approximately right angles to each other, the wings being mounted for rocking movement and having the axes of such movement disposed at the angle between the blades, whereby the blades are insured of opposite alternative extension into spanning relation with said opposite piston chambers.

2. A rotary motor having piston chambers and a rotor having a disk arranged between the planes of said piston chambers and carrying wings consisting of blades disposed at fixed angles with reference to each other and disposed radially of the disk for swinging movement with reference thereto, the axis of such movement being on the line of the angle between said blades, the said piston chambers being disposed in diametrically opposite relation with reference to the axis of said rotor disk.

3. A rotary motor having a stator consisting of a casing provided with diametrically opposite approximately semi-circular piston chambers, and a rotor consisting of a disk sectionally disposed respectively in said piston chambers and in a transverse plane between the same, the rotor carrying rocking axially arranged radial wings each consisting of a pair of blades disposed at a fixed angle and having the axis of their swinging movement on the line of the angle between the blades for alternate extension in opposite directions from the plane of the disk to occupy spanning positions alternately with reference to said diametrically opposite piston chambers, and inlet and exhaust ports connecting with opposite ends of each chamber, the inlet ports having nozzles for projecting the motive fluid in a direction tangential to the paths of movement of said blades.

In testimony whereof I affix my signature.

ELWOOD R. ZERKLE.